(12) United States Patent
Hejlsberg et al.

(10) Patent No.: US 7,574,701 B2
(45) Date of Patent: Aug. 11, 2009

(54) SYNTAX FOR MEMBERS ADDED THROUGH OBJECT PROTOCOL SYSTEMS AND METHODS

(75) Inventors: Anders Hejlsberg, Seattle, WA (US);
Henricus Johannes Maria Meijer, Mercer Island, WA (US); David Schach, Redmond, WA (US); Avner Aharoni, Seattle, WA (US); Brian Beckman, New Castle, WA (US); Andrew Kimball, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 239 days.

(21) Appl. No.: 11/507,637

(22) Filed: Aug. 21, 2006

(65) Prior Publication Data

US 2008/0046456 A1 Feb. 21, 2008

(51) Int. Cl.
*G06F 7/00* (2006.01)
*G06F 9/44* (2006.01)
*G06F 9/45* (2006.01)
*G06F 17/00* (2006.01)

(52) U.S. Cl. .................. 717/143; 707/102; 707/103 R; 707/103 Y; 717/106; 717/108; 717/114; 717/116; 717/117; 717/141

(58) Field of Classification Search ................ 707/102, 707/103 R, 103 Y; 717/106, 108, 114, 116, 717/117, 141, 143
See application file for complete search history.

(56) References Cited

U.S. PATENT DOCUMENTS

| | | | | |
|---|---|---|---|---|
| 5,437,027 A | * | 7/1995 | Bannon et al. | 707/103 R |
| 5,873,093 A | * | 2/1999 | Williamson et al. | 707/103 R |
| 5,875,331 A | * | 2/1999 | Lindsey | 717/108 |
| 6,052,526 A | | 4/2000 | Chatt | 395/705 |
| 6,253,366 B1 | | 6/2001 | Mutschler, III | 717/1 |
| 6,519,617 B1 | | 2/2003 | Wanderski et al. | 707/513 |
| 6,918,107 B2 | * | 7/2005 | Lucas et al. | 717/124 |
| 6,993,744 B2 | | 1/2006 | Hills | 717/108 |
| 7,130,863 B2 | * | 10/2006 | Diab | 707/103 R |
| 7,461,088 B2 | * | 12/2008 | Thorman et al. | 707/104.1 |
| 2004/0133537 A1 | | 7/2004 | Uceda-Sosa | 707/1 |
| 2004/0201600 A1 | | 10/2004 | Kakivaya et al. | 345/700 |
| 2005/0022164 A1 | * | 1/2005 | Takacsi-Nagy | 717/117 |
| 2005/0154978 A1 | * | 7/2005 | Albornoz et al. | 715/513 |
| 2006/0005175 A1 | | 1/2006 | Ringseth et al. | 717/143 |
| 2006/0236226 A1 | * | 10/2006 | Meijer et al. | 715/513 |
| 2006/0241961 A1 | * | 10/2006 | Tsyganskiy et al. | 705/1 |
| 2007/0038978 A1 | * | 2/2007 | Meijer et al. | 717/106 |

OTHER PUBLICATIONS

Aldrich et al., Providing Easier Access to Remote Objects in Client-Server Systems, Jan. 6-9, 1998, vol. 7, pp. 366-375.*
Brandt, S. et al., "Dynamic Reflection for a Statically Typed Language", http://citeseer.ist.psu.edu/cache/papers/cs/386/http:zSzzSzwww.daimi.au.dkz, 23 pages.

(Continued)

*Primary Examiner*—James Trujillo
*Assistant Examiner*—Jorge A Casanova
(74) *Attorney, Agent, or Firm*—Woodcock Washburn LLP (57) ABSTRACT

A special syntax is developed to differentiate between accesses to a primary and one or more secondary object protocols in a programming language. The syntax allows the compiler to differentiate between the primary and secondary object model based on syntax, rather than type. The syntax is created in such a way as to approximate the syntax of the secondary object model, and allows the user to dynamically generate member names.

17 Claims, 4 Drawing Sheets

OTHER PUBLICATIONS

Chiba, S. et al., "Avoiding Confusion in Metacircularity: The Meta-Helix", *Second 2nd JSSST International Symposium on Object Technologies for Advanced Software* (*ISOTAS*), 1996, 1049, 157-172.

Ishikawa, Y. et al., "Design and Implementation of Metalevel Architecture in C++– MPC++ Approach", http://www.pccluster.org/score/db/paper-E, 1996, 14 pages.

* cited by examiner

```
<foo bar = "some text">
<Name> Another Value </Name>
<Add> Additional</Add>
<foo-bar>Additional</foo-bar>
</foo>
```

```
<recipe name="bread" prep_time="10 mins" cook_time="4 hours">
 <title>bread</title>
  <ingredient amount="2.0" unit="cups">Water</ingredient>
  <ingredient amount="0.5" unit="ounces">Yeast</ingredient>
 <ingredient amount="4" unit="cups">Flour</ingredient>

<ingredient amount="2" unit="teaspoons">Salt</ingredient>
 <instructions>
<step>Mix all ingredients together</step>
<step>Put in warm room for one hour</step>
<step>Bake </step>
</instructions>
</recipe>
```

SYNTAX FOR MEMBERS ADDED THROUGH OBJECT PROTOCOL SYSTEMS AND METHODS

CROSS REFERENCE TO RELATED APPLICATIONS

This application is related to the application titled "COMPILE TIME META-OBJECT PROTOCOL SYSTEMS AND METHODS", U.S. patent application Ser. No. 11/108,455, filed Apr. 18, 2005. The contents of which are hereby incorporated in their entirety.

BACKGROUND

Several programming languages allow users to access object member using both a primary and secondary object model. For example, both E4X and Visual Basic 9.0 provide users the ability to access XML objects (secondary objects) using the same member access notation as ordinary object (primary objects) accessing. In these cases, the compiler must reinterpret the accesses in the primary object model into an access in the secondary object model.

Figure 1:
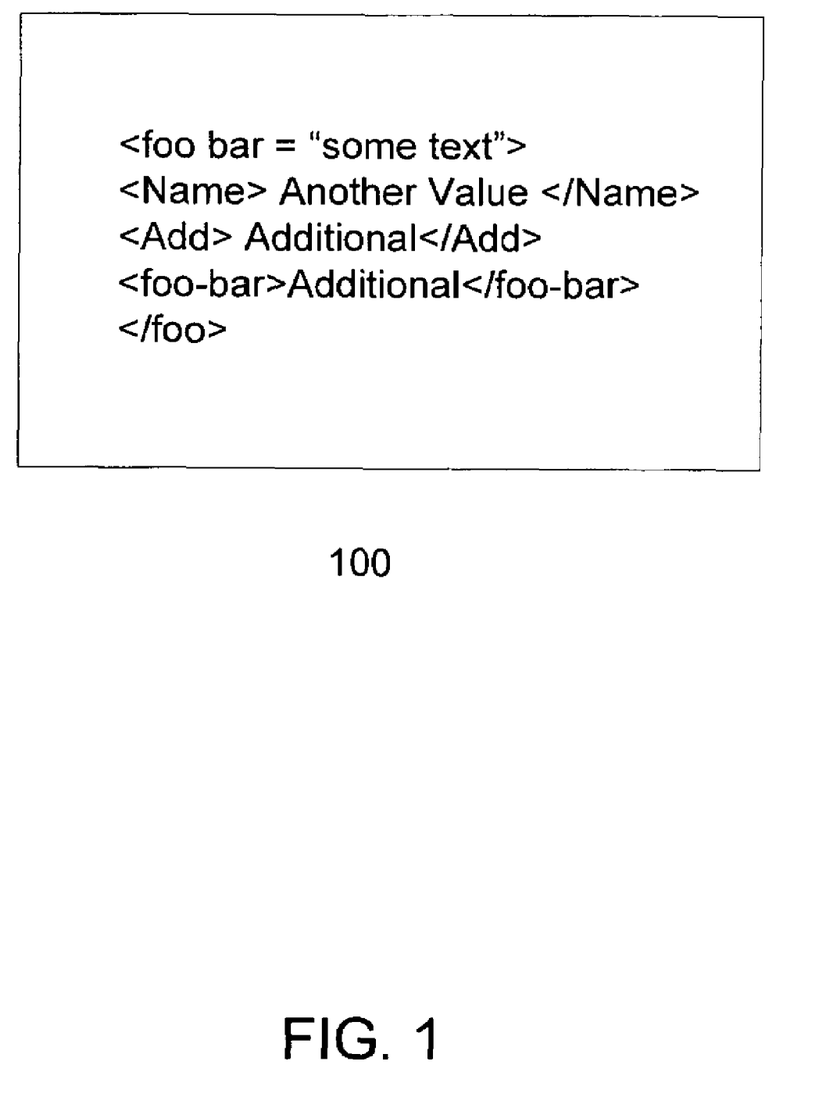
FIG. 1 is an illustration of a sample XML document 100.

However, problems can arise where there is ambiguity as to which model, i.e., the primary or secondary, the user may wish to access the particular object. Currently, compilers assume that an access is being made to the secondary object model unless there is an existing member in the primary object access model. For example, consider the piece of XML code 100 illustrated in FIG. 1. This piece of code may correspond to an XML object called "doc" for example. If the user tries to access the element Name by referencing "doc.Name", the compiler may be unsure if the user wishes to get the text associated with the Name element according to the secondary object model, or if the user wishes to access the member Name according to the primary object model. Similarly, if the user wishes to retrieve the first element corresponding to "doc.Add(0)", the compiler will be unsure if the user wants to add "0" to the doc element according to the primary object model, or retrieve the first element called Add according to the secondary object model.

In yet another example, a user may wish to access the element foo-bar of the XML document by typing "doc.foo-bar". In many programming languages this type of syntax is reserved and cannot be used for the primary object access, but will instead be interpreted by the compiler as the value "doc.foo"—the value of bar, for example. This is not desirable and may cause confusion when, as in this example, foo-bar is an acceptable name for an element of the secondary object model.

Prior solutions to this problem include explicit accesses through the primary object model into the secondary object using expressions such as doc.element("Add"), for example. However, these types of accesses are clumsy and it may be desirable to incorporate the notation of the underlying secondary object model into the syntax of the compiler or programming environment.

SUMMARY

A special syntax is developed to differentiate between accesses to a primary and one or more secondary object protocols in a programming language. The syntax allows the compiler to differentiate between the primary and secondary object model based on syntax, rather than type. The syntax is created in such a way as to approximate the syntax of the secondary object model, and allows the user to dynamically generate member names.

BRIEF DESCRIPTION OF THE DRAWINGS

The foregoing summary, as well as the following detailed description of preferred embodiments, is better understood when read in conjunction with the appended drawings. For the purpose of illustrating embodiments of the invention, there is shown in the drawings exemplary constructions of the invention; however, the invention is not limited to the specific methods and instrumentalities disclosed. Like reference numerals of the exemplary constructions represent similar parts throughout all of the drawings wherein.

DETAILED DESCRIPTION

As described above, there may be a certain ambiguity for a compiler in determining whether a user desires to access an object according to a primary object access model, or one of many secondary object access models. Accordingly, a special syntax that removes the ambiguity between accessing the primary and secondary objects is created. While the following examples and embodiments are described with reference to XML as the secondary object model, it is not meant to limit the invention to XML. Those skilled in the art will appreciate that the invention can be applied to any object model known in the art. For example, relational data object models, ID3 metadata object models, and object models for accessing user-supplied metadata tags from videos or photos.

One or more new types of operators are introduced into a programming language environment. In the current example, the operator "/" is used instead of the more common "." selector following the object name to distinguish between the primary and secondary object model. Thus, "doc.Name" refers to the member Name according to the primary object model, and "doc/Name" refers to the element Name using the secondary object model. Those of ordinary skill in the art will appreciate that "/" was chosen arbitrarily, and any character may be used.

It may be further desirable to make the notation that corresponds to the access of the secondary object model correspond to the particular type of secondary object model being utilized. For example, in the case of XML objects, the operators "<" and "@" may be used. The operator "<" corresponds to the notation for XML elements, while the "@" operator corresponds to the notation for XML attributes.

Referring again to FIG. 1, using these operators, a reference to the element Name becomes "doc.<Name>", and a reference to the attribute "bar" of the element "foo" becomes "doc.@bar".

Figure 2:
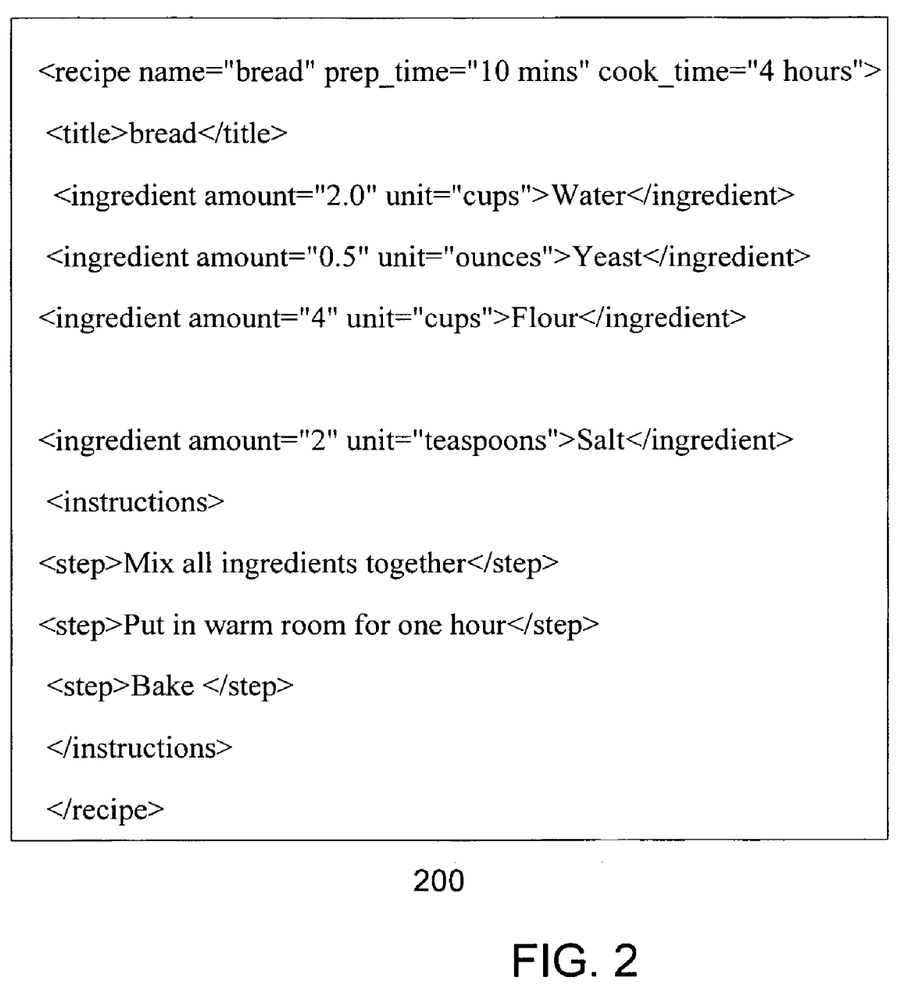
FIG. 2 is another illustration of a sample XML document 200.

FIG. 2 illustrates another sample piece of XML code. Similar to the previous example, this piece of code may correspond to an XML object called "doc", for example. This example illustrates how XML elements may have several elements of the same name, and how elements may themselves have one or more child or sub elements. If a user wishes to request a particular element from the XML object named "ingredient" according to the notation described above it may be unclear which element should be returned. In one configuration, the system may return the first element with a matching name, in another, all elements of that name may be returned. In order to allow the user to specify the particular element that they wish to retrieve, the compiler may further support the addition of characters that specify which element among a plurality of similarly named elements is desired. For example, the statement "doc.<ingredient(2)>" may be interpreted to return the third element named 'ingredient'. Similarly, the statement "doc.<ingredient(0)>" may return the first element named 'ingredient'. In another example, the statement "doc.<ingredient*>" may return every element named ingredient. Those skilled in the art will appreciate that the particular syntax and numbers chosen are arbitrary and not meant to limit the invention to the disclosed syntax. Any suitable syntax may be used.

In addition, FIG. 2 illustrates how many elements may comprise one or more child elements. These child elements may themselves contain further child elements, and so forth. For example, the element recipe comprises the child elements title, the four ingredient elements, and the instructions element. The instructions element in turn comprises four step child elements. Accordingly, a syntax may be developed to show that the user wishes to select a child element, or an attribute associated with a particular child element. In one embodiment the " . . . " operator may be used to indicate that the user wishes to access a child or other dependant. For example, the if user entered command "doc . . . <ingredient>", the system might return all the children and descendant ingredient elements. Similarly, if the user entered "doc . . . @unit", the system would return all the child descendent attributes named unit.

In yet another embodiment, the syntax used to denote member access using the secondary object model may be further modified to support the dynamic computation of member names.

For example, in a particular program the user may define the variable x to be equal to "ingredient" with the statement "x=ingredient". Later, the user may then reference the XML document shown in FIG. 2 with the statement "doc.<x>". The compiler desirably recognizes that x has been defined as "ingredient" and dynamically substitutes the string ingredient for x in the expression. The user could also reference the second element of the same name using the expression "doc.<x(1)>". As an alternative, the syntax that is used in XML for expression holes, "<% %>" may be utilized. In that case, the above expressions would be written "doc.<% x %>" and "doc.<% x % (1)>", for example.

In a further example, the system provides for the inclusion of fully qualified names including XML namespaces between the angled brackets. For example, the statement "doc.<{http://somenamespace}child>" would direct the compiler to the namespace referenced by the URL http://somenamespace to identify the member according to the secondary object model. The user may also enter complete programs, or references to such programs, in between the angled brackets. The compiler or programming environment may then reference those programs or namespaces to dynamically compute the desired member names for accessing the particular object according to the secondary object model. The programs may be written using any secondary (i.e., different from the primary programming language used in the programming environment) programming or query language known in the art, for example.

Figure 3A:
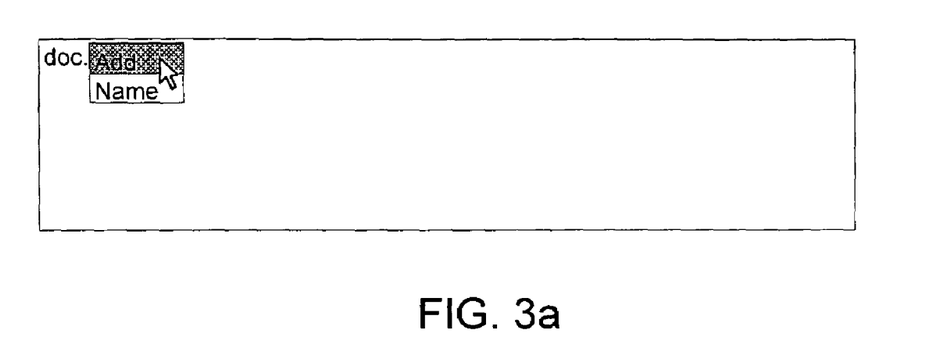
FIGS. 3a and 3b are illustrations of screen shots of an exemplary visual programming environment in accordance with the present invention.
Figure 3B:
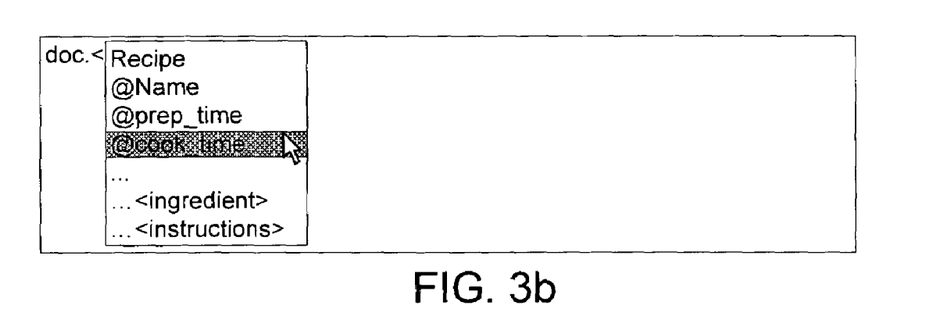

FIGS. 3a and 3b are exemplary screen shots illustrates the incorporation of the particular secondary object model access syntax into the visual programming environment. The visual programming environment may be Microsoft Visual Studio, for example. However, any visual programming tool known in the art may be used.

Currently, when a user in visual programming language types the name of an object followed by a selector, such as ".", the user is presented with a drop down list showing the user the available members of that object. The user may then continue to type the desired member name, or select the member from the drop down list. As shown in FIG. 3a, the user is presented with a list of the available members in the doc object. After the user types the "." selector the drop down list is shown with the available members according to the primary object model. In this example, the user is presented with the member names corresponding to "Name" and "Add".

FIG. 3b illustrates how the secondary object access notation may be incorporated into the visual programming environment. After the user types the "." selector, if the user further types a "<" operator, signifying member access using the secondary object model, the visual programming environment desirably recognizes that the user desires to access the object using the secondary object model and accordingly displays the members available under the secondary object model. In this example, the user is presented with the element "recipe", the attributes "prep_time" and "cook_time", and the child elements "ingredient" and "instructions". The user may then select one of the listed members and the selected member will be placed in the visual programming environment.

Exemplary Computing Device

Figure 4:
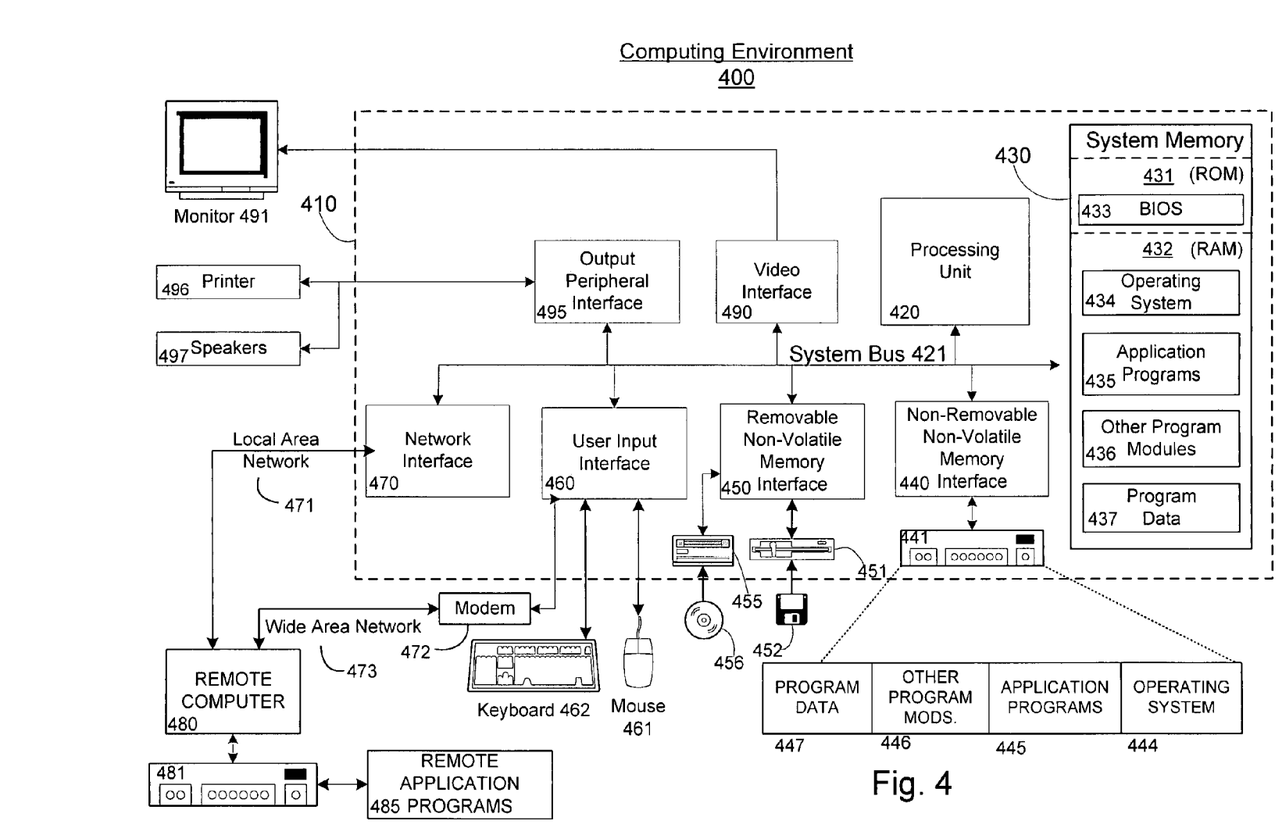
FIG. 4 is a block diagram showing an exemplary computing environment in which aspects of the invention may be implemented.

FIG. 4 and the following discussion are intended to provide a brief general description of a suitable computing environment in which embodiments of the invention may be implemented. While a general purpose computer is described below, this is but one example, and embodiments of the invention may be implemented with other computing devices, such as a client having network/bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

FIG. 4 thus illustrates an example of a suitable computing system environment 400 in which the embodiments of the invention may be implemented, although as made clear above, the computing system environment 400 is only one example of a suitable computing environment and is not intended to suggest any limitation as to the scope of use or functionality of an embodiment of the invention. Neither should the computing environment 400 be interpreted as having any dependency or requirement relating to any one or combination of components illustrated in the exemplary operating environment 400.

With reference to FIG. 4, an exemplary system for implementing an embodiment of the invention includes a general purpose computing device in the form of a computer system 410. Components of computer system 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 410 typically includes a variety of computer readable media. Computer readable media can be any available media that can be accessed by computer system 410 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer system 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer system 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4 provide storage of computer readable instructions, data structures, program modules and other data for the computer system 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information into the computer system 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB). A monitor 491 or other type of display device is also connected to the system bus 421 via an interface, such as a video interface 490, which may in turn communicate with video memory (not shown). In addition to monitor 491, computer systems may also include other peripheral output devices such as speakers 497 and printer 496, which may be connected through an output peripheral interface 495.

The computer system 410 may operate in a networked or distributed environment using logical connections to one or more remote computers, such as a remote computer 480. The remote computer 480 may be a personal computer, a server, a router, a network PC, a peer device or other common network node, and typically includes many or all of the elements described above relative to the computer system 410, although only a memory storage device 481 has been illustrated in FIG. 4. The logical connections depicted in FIG. 4 include a local area network (LAN) 471 and a wide area network (WAN) 473, but may also include other networks/buses. Such networking environments are commonplace in homes, offices, enterprise-wide computer networks, intranets and the Internet.

When used in a LAN networking environment, the computer system 410 is connected to the LAN 471 through a network interface or adapter 470. When used in a WAN networking environment, the computer system 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer system 410, or portions thereof, may be stored in the remote memory storage device. By way of example, and not limitation, FIG. 4 illustrates remote application programs 485 as residing on memory device 481. It will be appreciated that the network connections shown are exemplary and other means of establishing a communications link between the computers may be used.

As mentioned above, while exemplary embodiments of the invention have been described in connection with various computing devices and network architectures, the underlying concepts may be applied to any computing device or system in which it is desirable to implement a method to map structured elements to an observable form. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of an embodiment of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A method for integrating a secondary object model into a programming environment containing a primary object model, the method comprising:

differentiating, by a compiler, between a desired access to the primary object model and a desired access to the secondary object model based on an access differentiating syntax that incorporates a notation of the secondary object model and at least one operator of the secondary object model into a syntax of the primary object model, the secondary object model incorporated into the programming environment such that member access to an object may be made according to either the primary or secondary object model; and dynamically computing a desired member name for accessing the object according to the secondary object model by referencing a namespace to identify a member according to the secondary object model.

2. The method of claim 1, wherein the secondary object model is XML.

3. The method of claim 1, wherein the secondary object model is one of object model of relational data, or user-defined metadata tags.

4. The method of claim 1, wherein the access differentiating syntax comprises symbols that distinguish between members in the secondary object model.

5. The method of claim 4, wherein the syntax .<name> corresponds to accessing elements in the secondary object model.

6. The method of claim 4, wherein the syntax .@name corresponds to accessing attributes in the secondary object model.

7. The method of claim 4, wherein the syntax . . . <name> corresponds to accessing descendant elements in the secondary object model.

8. The method of claim 4, wherein the syntax . . . @name corresponds to accessing descendant attributes in the secondary object model.

9. The method of claim 1 wherein the member names are dynamically generated according to a secondary programming or query language.

10. The method of claim 1, wherein the programming environment comprises a visual programming environment further comprising:

receiving a user input using the access differentiating syntax, the user input including a name of an object followed by one of a selector indicating a desired member access to an object using the primary object model or a selector followed by an operator indicating a desired member access to an object using the secondary object model;

displaying to the user, via a drop down list, the available members for the object according to the user input; and receiving a user selection of one of the available members.

11. The method of claim 10, further comprising receiving a selection from the user corresponding to one of the displayed members.

12. The method of claim 10, wherein the object is an XML object.

13. The method of claim 10, wherein the object is one of a relational data object or a user-defined metadata tag object.

14. A computer-readable storage medium with computer-executable instructions stored thereon for performing the method of:

differentiating by a compiler, between a desired access to the primary object model and a desired access to the secondary object model based on an access differentiating syntax that incorporates a notation of the secondary object model and at least one operator of the secondary object model into a syntax of the primary object model, the secondary object model incorporated into the programming environment such that member access to an object may be made according to either the primary or secondary object model; and dynamically computing a desired member name for accessing the object according to the secondary object model by referencing a namespace to identify a member according to the secondary object model.

15. The computer-readable storage medium of claim 14, wherein the secondary object model is one of XML, object model of relational data, or user-defined metadata tags.

16. The computer-readable storage medium of claim 14, wherein the access differentiating syntax comprises symbols that distinguish between members in the secondary object model.

17. The computer-readable storage medium of claim 14, wherein the member names are dynamically generated according to a secondary programming or query language.

* * * * *